July 15, 1952 W. H. BURKHART ET AL 2,603,746

SWITCHING CIRCUIT

Filed Oct. 13, 1950

INVENTORS
WILLIAM H. BURKHART
AMIR H. SEPAHBAN
BY George H. Lorch
ATTORNEY

Patented July 15, 1952 2,603,746

UNITED STATES PATENT OFFICE 2,603,746

SWITCHING CIRCUIT

William Henry Burkhart and Amir Hassan Sepahban, East Orange, N. J., assignors to Monroe Calculating Machine Company, Orange, N. J., a corporation of Delaware Application October 13, 1950, Serial No. 189,922

14 Claims. (Cl. 250—27)

This invention relates to electronic switching circuits particularly suitable for receiving two or more input variables, such as electric voltages or potentials and combining them to control a single output voltage which may be connected to one or more additional similar circuits. Such circuits are especially useful as preassembled units, "building blocks," or "stages" in switching networks, arithmetic networks, rings, translators, and gating devices, and are particularly useful in electronic digital computing machines in which the binary or coded decimal system of computation is used.

According to this invention, two or more incoming variable potentials are combined through resistances of selected values and are then impressed upon the single grid of a triode to control conductivity of the tube and therefore the output of the tube. The output or anode circuit may be coupled to a subsequent stage or stages and it includes a voltage divider, the resistance values of which are so selected and adjusted with respect to the tube characteristics, particularly gain and cut-off, that it enables a further stage to be controlled with the same voltage swing on its control grid as is supplied to the first stage. In other words, the two values, high and low, of the inputs are substantially matched in the output.

Accordingly, it is among the objects of this invention to provide an electronic circuit for delivering an output which may be held at one of two voltage levels dependent on whether the applied input signals are combined at the higher of said levels, that being above cut-off potential, or whether the resultant input is of any potential below cut-off.

Another object is to provide electronic gating means for combining the effects of $n$ binary input variables, $a, b, c, \ldots n$, each of which will have at a given instant either one or the other of two potentials $e_1$ and $e_2$, where $e_1$ is more positive than a cut-off potential $e_c$ and $e_2$ is more negative than $e_c$, said means being capable of delivering an output which has either a high level equal to $e_1$ or a low level equal to $e_2$, depending upon the ratio between the number of said input variables which have the value $e_1$ and those which have the value $e_2$.

Still another object is to provide the means for composing an electronic system which shall have a plurality of identical units or "building blocks" such as described in the two preceding paragraphs, where concatenated control of the units from stage to stage may be obtained without attenuation of the output voltage swing and without appreciable back effect on the first unit.

It is among the features of this invention to employ triode vacuum tubes or the equivalent rather than multigrid tubes, as commonly used when there are two or more inputs for any one tube. However, miniature twin triode tubes may be used to effect economy of space and cost. One positive and one negative power supply is sufficient for any number of tubes.

The objects as above mentioned are achieved through a choice of components of the "building block" and through advantageous synthesizing of these blocks for various ultimate purposes such as meet the requirements of digital computers, electronic gates, counting chains, comparators, coincidence devices and, generally speaking, a great variety of electronic switching devices. The principles of the invention are well illustrated, however, in its application to a binary adding machine chosen as an example. The embodiment herein shown may be considered as one digital stage of such an adding machine, or it may be used as a component of a coded decimal adder. Numerous other applications may readily be developed by those skilled in the art.

In electronic computing machines which deal with binary numbers, the digit 1 may arbitrarily be represented by a voltage $e_1$ equal to 0 volts, for example. The digit 0 may also arbitrarily be represented by a voltage $e_2$ equal to −20 volts, for example. As will be shown hereinafter, a practical circuit arrangement for use as a binary adder may have such other characteristics as would render this choice of values for $e_1$ and $e_2$ dependable and otherwise desirable, though other values may readily be selected to meet individual requirements of a circuit and its operating components.

For a better understanding of this invention reference will now be made to the accompanying drawings, in which.

Figure 1:
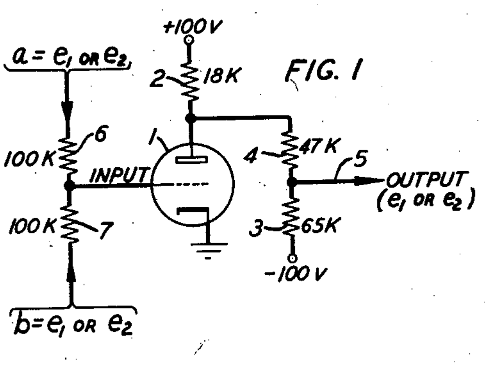
Fig. 1 is a basic electronic switching circuit in which two variables (inputs), such as potentials representative of two binary numbers, are made applicable for joint control of a single grid of a triode, to deliver one or the other of two output potentials having the same range of variation as the input potentials.
Figure 4:
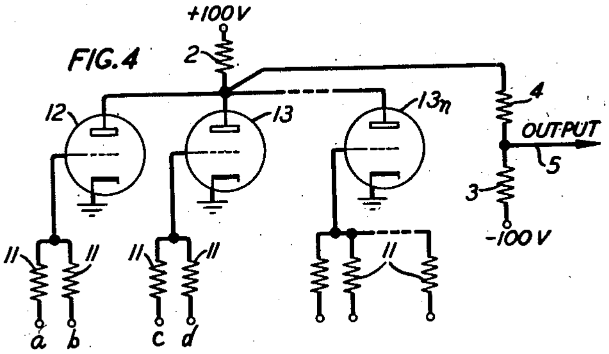
Figure 5:
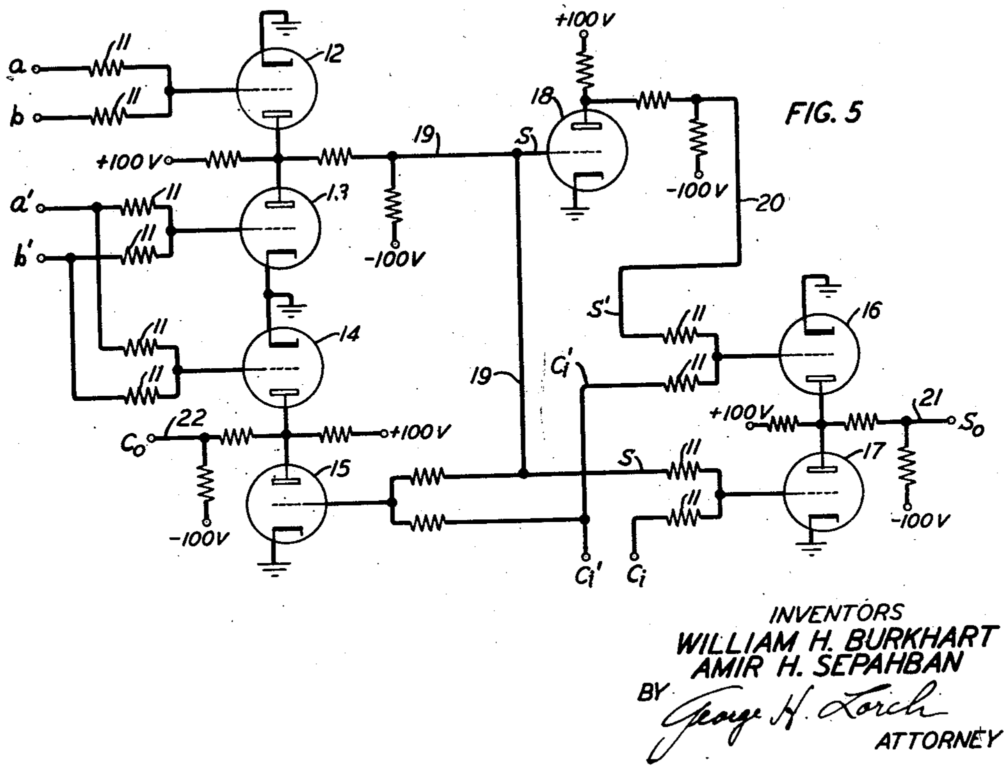

Fig. 4 shows an arrangement of a plurality of triode tubes having their anodes parallel-connected, so that the common output shall be high or low, depending on whether, in the case of only two tubes (a) both tubes are nonconductive, or (b) one or both tubes are conductive; and Fig. 5 shows an arrangement of seven triodes having the same or similar circuit parameters with respect to the triode of Fig. 1, this arrangement being suitable for use as a one-stage unit for digital addition or subtraction of binary numbers.

The basic unit, or "building block" shown in Fig. 1 will first be described. The triode discharge tube 1 has its cathode grounded and its anode is connected through a resistor 2 to the positive terminal of a direct current source delivering potentials of +100 volts and −100 volts and having a grounded neutral, or 0-volt terminal. The negative terminal of this source is also connected to the anode of the tube through voltage divider resistors 3 and 4. An output lead or utilization circuit 5 is connected to the junction between resistors 3 and 4.

Two input potentials $a$ and $b$ are to be fed simultaneously to the grid of tube 1 through resistors 6 and 7 respectively. Each of these input potentials, which are mutually independent, may have a value $e_1$ or $e_2$, representative, for example, of the binary digits 1 and 0 respectively. Or, if the switching unit is to be used in a system dealing with symbolic logic, $e_1$ may represent a statement and $e_2$ may represent the negation of that statement. Symbolic logic deals with statements and words, such as "and, or, not, same, different, some, all." The principle of this invention will, however, be sufficiently explained by confining further description mostly to its mathematical uses.

The following input and output potentials have proven practical for electronic computers: $e_1=0$ volts and $e_2=-20$ volts. These potentials will be understood to meet the requirements of our "building block" having the circuit parameters as shown, although it will be apparent that variations in the values of the circuit elements may dictate somewhat different signal potentials.

On the assumption that a standard double triode tube such as 12AU7 is to be used, then the resistor values which we have found particularly well suited to our requirements are as follows, and will be taken as circuit parameters for each half of the twin triode, the other half being considered a duplicate building block which would have its own similar circuit components:

| | Ohms |
|---|---|
| Resistor **2** | 18,000 |
| Resistor **3** | 65,000 |
| Resistor **4** | 47,000 |
| Resistors **6** and **7** (each) | 100,000 |

These resistor values have been chosen with the object of insuring that the output potential shall be equal to one of the input potentials $e_1$ or $e_2$ depending on whether the combined effect of those input potentials is to render the tube conductive or to bias it below cut-off. The cut-off potential of tube 12AU7 is −6 volts when powered with the anode potential as shown.

When a tube stage such as that of Fig. 1 is to be one of several concatenated stages, it is desirable that the resistances of the input couplings be high with respect to the impedance of the driving circuit.

The input signals may be derived from any suitable source or sources, not shown. Such a source, for example, may be a trigger tube; that is, either a twin triode connected for flip-flop operation, or a gaseous discharge tube with hot or cold cathode. The signals may result from the read-out of data stored on a magnetic tape or drum. They may be derived from pulse keying of a perforated tape, or other memory device.

In the operation of the tube stage shown in Fig. 1 let it be assumed that a low voltage output $e_2$ is desired when the input signals $a$ and $b$ are both high and that a high voltage output $e_1$ is desired when either or both of the input signals is of low voltage. It will be apparent that, disregarding the effect of grid current, the grid will be at 0 volts if both signals $a$ and $b$ are at 0 volts. Then the tube 1 will be conductive and its output lead 5 will have the potential $e_2=-20$ v. The tube will otherwise be non-conductive since, if both signals $a$ and $b$ are at −20 v., the grid will be at −20 v., which is far below cut-off; or, if only one of the signals $a$ and $b$ is at −20 v., the grid will be at −10 v., which also is below the cut-off level −6 v. In either case, the output will be $e_1=0$ volts.

The several results of operation as described in the preceding paragraph may be tabulated thus:

| Input Signals $a$ | Input Signals $b$ | Tube | Output Signal |
|---|---|---|---|
| $e_2$ | $e_2$ | cut-off | $e_1$ |
| $e_2$ | $e_1$ | do | $e_1$ |
| $e_1$ | $e_2$ | do | $e_1$ |
| $e_1$ | $e_1$ | conductive | $e_2$ |

The above table shows that gating operations may be performed either when the circuit is to be used in mathematical work or in dealing with problems of symbolic logic.

Figure 2:
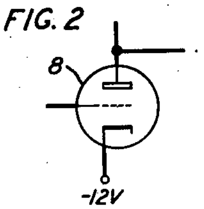
Fig. 2 shows a modification of part of the circuit of Fig. 1.

Fig. 2 shows a triode having its cathode connected to the direct current operating source to give it a potential of −12 v. with respect to ground. In other respects the tube has circuit components corresponding with those of Fig. 1. When the cathode is negatively biased in this way, the same potentials $e_1$ and $e_2$ may be used for signal input as in the case of Fig. 1, but the results will be different.

When a negative bias of −12 volts is applied to the cathode of tube 8 (Fig. 2) and the same input potentials $e_1$ and $e_2$ are applied as before, the cut-off bias then becomes −18 volts, that is, 6 volts below the cathode potential. The circuit of Fig. 1, tube 8 being substituted for tube 1, then produces a high output potential $e_1$ when signals $a$ and $b$ are both low, and a low output potential in the other three alternative cases, thus:

| Input Signals $a$ | Input Signals $b$ | Tube | Output Signal |
|---|---|---|---|
| $e_2$ | $e_2$ | cut-off | $e_1$ |
| $e_2$ | $e_1$ | conductive | $e_2$ |
| $e_1$ | $e_2$ | do | $e_2$ |
| $e_1$ | $e_1$ | do | $e_2$ |

The conductive state in the last three cases is attributable to the fact that when input signals $e_1$ and $e_2$ are combined, they produce a grid voltage of −10 v. which is more positive than the cut-off voltage, −18 v., and when the input signals are both at the level of $e_1$ or 0 volts, the tube is also conductive. But the cut-off condition is only obtained when both input signals are at the level of $e_2$. Only in this case is the output signal delivered at voltage $e_1$.

Figure 3:
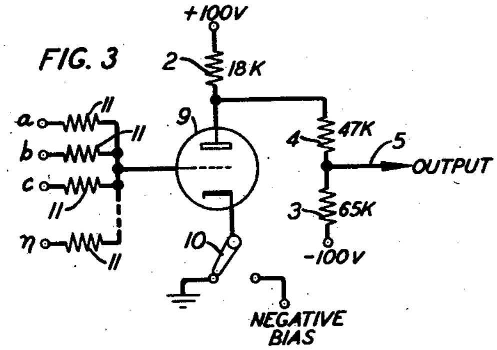
Fig. 3 shows how the circuit of Fig. 1 or of Fig. 2 may be expanded to provide joint control of a triode tube by $n$ variable inputs.

The circuit arrangement shown in Fig. 3 is one for producing an output signal $e_1$ or $e_2$, which distinguishes between the resultant input voltage above and below the cut-off point, when that resultant is the average of three or more simultaneously applied input signals each having one or the other of two values $e_1$ and $e_2$.

The cathode of tube 9 may be grounded, or, through switch 10, it may receive a negative bias the value of which will depend on the cut-off bias that is needed to obtain a desirable distinction between the resultants of simultaneously applied signals, *a, b, c, . . . n,* where some resultants are above and some resultants are below the cut-off voltage applied to the grid. The grid potential will, of course, be the average of potentials $e_1$ and/or $e_2$ as applied by signals *a, b, c, . . . n,* provided that the parallel grid resistors 11 are of equal value, as is preferred.

The values of components in the circuit of Fig. 3 to be chosen for optimum performance are, to a considerable extent, concerned with the D. C. gain characteristic of the tube that is used.

The D. C. gain is one of the factors that will determine the number of variables or inputs that can be combined and impressed upon the single grid of a triode with positive discrimination or selection by the tube. So the gain, and hence the total number of variables that may be combined is at least partly dependent on the value of resistors 2, 3, and 4, and the proportioning of these resistors each to the others.

The optimum selection of these resistor values is also one which provides for suitable transient response as well as for delivery of an output signal $e_1$ only when the grid voltage is below that of cut-off $e_c$. Assuming that it is required to obtain a plate rise time of about 5 microseconds, then it follows that a value of 18,000 ohms for the plate resistor would be suitable. Given then the requirement of 18,000 ohms in the resistor 2, we choose the values of the other resistors 3 and 4 so as to provide the maximum gain.

It will be noted that the resistance 18,000 Ω of resistor 2 plus the resistance 47,000 Ω of resistor 4 equals the value 65,000 Ω of resistor 3. Hence, when tube 1 is non-conducting, signal $e_1$ or 0 volts, is impressed on the output lead 5, this lead being tapped off of the mid-point of the voltage divider between +100 v. and −100 v. Also, when tube 1 is conducting its anode potential is lowered to a value which gives $e_2=-20$ v., as the output potential on lead 5.

The output circuit resistor values for resistors 2, 3, and 4, as stated above, are a satisfactory compromise between the low current desirable in the voltage divider at cut-off condition and low time delay due to the charge and discharge of interelectrode and stray capacities.

The circuit arrangement of Fig. 3 is theoretically capable of use to combine a plurality of ($n$) inputs each having a value $e_1$ or $e_2$ volts and to give a single output voltage also having one or the other of the same voltages depending upon whether the tube is or is not driven to cut-off.

Assume a plurality of $n$ inputs, that is, a plurality of variable voltages or potentials, *a, b, c, . . . n,* each of which will have either the high value $e_1$ or the low value $e_2$. Further assume that at some instant a certain number $h$ of these inputs will be high. Then the remainder of the inputs $j$ or $n-h$ will be low.

As in Fig. 1, the inputs (binary variables) are connected through resistors 11 of equal value to the single grid of triode tube 9. The input coupling is in effect a potentiometer of which the tapping is on the grid. If, of these, inputs $h$ are assumed to have high values (0 volts) then $j$ or $n-h$ will have low values (−20 v.) at the same instant. Assume that the cathode is grounded, as when switch 10 is set in the position shown. Otherwise the circuit components of Fig. 3 are the same as described in connection with Fig. 1.

When each of the resistors 11 has the same value R as previously stated, then the instantaneous input grid voltage $-X_i$ may be expressed as:

$$-X_i=e_2+(e_1-e_2)\frac{\frac{R}{j}}{\frac{R}{h}+\frac{R}{j}} \qquad (1)$$

But since $h+j=n$ and since all resistors 11 have the same value R, Formula 1 can be simplified thus:

$$-X_i=e_2+(e_1-e_2)\frac{h}{n} \qquad (2)$$

The following table shows certain specific values for $-X_i$ when $e_1=0$ volts and $e_2=-20$ v., Formula 2 being used:

| Number of Inputs $e_1$ | Number of Inputs $e_2$ | $-X_i$ (volts) |
|---|---|---|
| 0 | $n$ | −20 |
| 1 | $n-1$ | $-20-\frac{-20}{n}$ |
| 2 | $n-2$ | $-20-\frac{-40}{n}$ |
| 3 | $n-3$ | $-20-\frac{-60}{n}$ |
| $n-1$ | 1 | $-20-\frac{-20(n-1)}{n}$ |
| $n$ | 0 | 0 |

And when $n=3$ for example:

| Number of Inputs $e_1$ | Number of Inputs $e_2$ | $-X_i$ (volts) |
|---|---|---|
| 0 | 3 | −20 |
| 1 | 2 | −13 |
| 2 | 1 | −7 |
| 3 | 0 | 0 |

Now the tube characteristics and the values of the voltage divider sections can be so chosen that the cut-off voltage will fall between any two of the $n+1$ possible voltages on the grid. But a simpler way to adjust the circuit for a desired discrimination is to set switch 10 over to the right as shown in Fig. 3 and to supply a suitable negative bias to the cathode. Different values of negative bias will produce different output responses, as will be apparent. Thus if the output is to be $e_2$ only when all the input voltages are $e_1$, then the cathode should be grounded. Or, if the output is to be $e_2$ when the number of input voltages $e_1$ is either $n-1$ or $n$, then the negative bias to be applied to the cathode, assuming that $n=3$, as in the above table, should be approximately −10 volts so as to discriminate between $h=2$ and $h=1$.

Since $e_1$ or $e_2$, the input voltages, could be the output of a previous unit or stage, their difference should have a large absolute value. This requires substantial voltage gain in the tube, as will be seen from the following aspects of the case where, as tabulated above, $n=3$ and the value of $-X_1$ varies in steps of approximately 6.67 volts:

(1) As the number of inputs is increased, the difference magnitude of the steps of $-X_1$ voltages is diminished, since it is nominally $$\frac{e_2-e_1}{n}$$

(2) Discrimination between adjacent magnitudes of $-X_1$, to be dependable, must, in turn, depend on setting the cut-off voltage about midway between such adjacent magnitudes. In a reduction to practice of this invention it has been found that, using a tube of the type 12AU7, the circuit operates reliably when $n=3$. It is known, however, that $n$ could be a greater number and still retain the reliability of operation. The increase in the number of inputs should, however, be accompanied by the adoption of higher resistance values for the resistors 11. Feed back from other associated circuits is thereby minimized, although speed of operation may have to be sacrificed in certain cases. If any other tube is to be used for this type of circuit it can be seen that the maximum number of resistors to the grid is limited by the ratio of output voltage swing to cut-off bias value.

It should be mentioned here that the ohmic value to be chosen for the input circuit resistors 11 is dependent on the magnitude of the load in the output circuit. Undesirable feed-back conditions are, however, found to be avoidable either by choosing input resistor values which lie above certain minima in respect to a given number $m$ of different loads of unit wattage, or else by the adoption of a suitably greater power supply voltage.

To be more specific regarding the subject of the preceding paragraph, it has been found experimentally and mathematically that when the output of one of our typical building blocks as above described is fed simultaneously to the inputs of several other such building blocks, the following minimum ohmic values for resistors 11 must be recognized, where $m$ represents the unit load value of each of the parallel-connected "building blocks" to which the output of a first stage circuit is fed:

| m | Minimum value of 11 |
|---|---|
| | *ohms* |
| 2 | 50,000 |
| 3 | 112,000 |
| 4 | 170,000 |

The above table is satisfied under conditions wherein the power supply terminals are fixed at +100 volts and −100 volts respectively and when the voltage divider sections are of the ohmic values shown in Fig. 1, also when there are just two input resistors connected to each "building block" unit.

In certain uses for the circuit of Fig. 3 it is necessary that the switch 10 be thrown to the right so that the negative bias applied to the cathode shall assume a value such that the tube conducts when any one or more of the $n$ inputs is $e_1$ and is cut-off only when all inputs are $e_2$. The negative bias on the cathode may in this case be easily adjusted to give the desired discrimination.

Fig. 4 shows one way by which a plurality of tube circuits of our "building-block" type may be combined. Here there are at least two triode tubes 12 and 13 having their anodes interconnected so that they share in common the voltage divider sections 2, 3, and 4, and the common output lead 5. Tube 12 has its grid subject to control from two input signal sources $a$ and $b$, while tube 13 has its grid similarly controlled from two other input signal sources $c$ and $d$. An $n$th tube $13n$ is also shown having more than two independent input circuits. Additional input signal sources may also be connected to the grids of tubes 12 and 13 if desired.

When the circuit of Fig. 4 is limited to tubes 12 and 13 it will be apparent from the foregoing description that the four input circuits of Fig. 4 result in an output that will be high only when both tubes are non-conductive, i. e., in any case except when only $a$ and $b$ are simultaneously high or when only $c$ and $d$ are simultaneously high, or when all four are high. When an additional tube or tubes including tube $13n$ are used, it is generally the case that a low output potential will result when any or all of the tubes are conductive, and a high output potential will result when all and only all of the tubes are simultaneously non-conductive.

Fig. 5 shows a circuit arrangement in which several of the parallel-connected tube pairs of Fig. 4 are utilized. This circuit is well suited for obtaining the sum or difference between two binary numbers in one denominational stage or order of a calculator and for giving effect to a "carry" requirement as derived from a preceding stage. The components of the circuit of Fig. 5 will now be described, after which the operation will be explained.

Tubes 12 to 17 inclusive have their anodes and output circuits connected in pairs to voltage divider resistors and output circuits the same as in Fig. 4. All of the cathodes of these tubes are grounded. The grid resistors 11 are all of the same value. The common power supply has positive, negative and grounded neutral terminals appropriately connected to terminals as labeled illustratively (+100 v., ground, −100 v.) in Fig. 5. Tube 18 is a single triode used as an inverter and has circuit components the same as tube 1 in Fig. 1.

Let $a$ and $b$ represent two binary digits to be added. If either or both of these digits is "1" and is represented by an input signal $e_1$ (0 volts, for example), then inversely, $a'$ and/or $b'$ will be represented as input signals $e_2$ (−20 volts, for example). That is, when $a$ is high, $a'$ is low and vice versa. Similarly with respect to $b$ and $b'$. The inverse inputs may each be derived from an output lead of a trigger pair in which when the stable state is triggered from one side to the other the voltages $a$ and $a'$ are interchanged. So likewise the voltages $b$ and $b'$ are interchanged if another trigger pair is actuated.

Input circuits which carry signals $a$ and $b$ are applied to the grid of tube 12. Tubes 13 and 14 are both subject to control by input signals $a'$ and $b'$. The conductive or non-conductive state of tube 14 is always the same as that of tube 13 and for reasons presently to be explained.

By way of illustration, the operation of the circuit of Fig. 5 will be described with reference to its use as a digital adder. In the binary system, as well as in a coded decimal system, the sum $a+b$ must be one or another of three different digital values, "0," "1," or "0" with a carry to the next higher order. When $a$="0" and $b$="0" the grid of tube 12 will have the potential $e_2$ (−20 volts), as explained in reference to Fig. 1. This tube will then be non-conductive. It will still be non-conductive if $a$="1" and $b$="0," or if $a$="0" and $b$="1." Only when $a$="1" and $b$="1" do we obtain a grid potential of $e_1$ (0 volts) in tube 12 to cause conduction.

Now since tube 13 is controlled by the joint effect of potentials $a'$ and $b'$, these having been defined as the inverse of $a$ and $b$ respectively, it follows that when $a$="0" and $b$="0," the potentials of signals $a'$ and $b'$ will both be at 0 volts and the grid of tube 13 will be driven sufficiently positive to produce conduction in this tube. In each of the other conditions, as described in the preceding paragraph, the grid of tube 13 will be at some potential below cut-off and this tube will not conduct.

Under the conditions described in the two immediately preceding paragraphs, the common output circuit for tubes 12 and 13 will now deliver potentials as follows:

| Digit Values | | | Voltages | | |
|---|---|---|---|---|---|
| Item Sources | | The Sum | Input Signals | | Output on Wire 19 |
| a | b | | Tube 12 | Tube 13 | |
| 0 | 0 | 0 | $e_2$ | $e_1$ | $e_2$ |
| 1 | 0 | 1 | $\frac{e_1+e_2}{2}$ | $\frac{e_2+e_1}{2}$ | $e_1$ |
| 0 | 1 | 1 | $\frac{e_2+e_1}{2}$ | $\frac{e_1+e_2}{2}$ | $e_1$ |
| 1 | 1 | 10 | $e_1$ | $e_2$ | $e_2$ |

The operation of tubes 12 and 13 does not provide a result by which the digital sum 0+0=0 can be distinguished from 1+1=0 with carry, although a tentative value is given for the units digit in the denomination to which the circuit applies. Usually a binary adder must deal with multi-digit numbers and, therefore, must take care of "carries" from a lower order and to a higher order. The circuit of Fig. 5 includes the means for doing this.

Triode tube 18 is simply an inverter. Its grid is controlled by the output signal on conductor 19, this being a potential $s$ which represents the tentative sum $a+b$. The potential $s'$ on output conductor 20 of tube 18 represents the inversion of $s$. We are now required to add a carry signal, if any, as coming from a lower digital order, of the binary computer. Let $c_i$ represent such a carry signal and $c'_i$ will represent the inversion of that signal. The potential $c_i=e_1=0$ volts when it represents the binary number "1," and at the same time $c'_i$, being an inversion of $c_i$ must have the value $e_2=-20$ volts. So, also $c_i=e_2=-20$ volts when binary number "0" is to be represented, and at the same time $c'_i=e_1=0$ volts.

The pair of triode tubes 16 and 17 is used to obtain an output signal representing the units digit of a binary sum $s+c_i=S_0$ where $s$ and $c$ are as defined above and where $S_0$ is the wanted potential for indicating the summation $a+b+c_i$ only as regards the digital order to which the circuit applies.

The grid of tube 16 is subject to joint control by potentials $s'$ and $c'_i$, whereas the grid of tube 17 is subject to joint control by potentials $s$ and $c_i$. There are only four possible permutations of these potentials due to the fact that $s'$ is the inversion of $s$, and $c'_i$ is the inversion of $c_i$. So the results derivable from the operation of tubes 16 and 17 may be tabulated thus:

| Digital Numbers Represented | | Voltages of Input Signals | | | | Output on Wire 21 | Digit Value $S_0$ |
|---|---|---|---|---|---|---|---|
| | | Tube 16 | | Tube 17 | | | |
| $s$ | $c_i$ | $s'$ | $c'_i$ | $s$ | $c_i$ | | |
| (1) 0 | 0 | $^*e_1$ | $^*e_1$ | $e_2$ | $e_2$ | $e_2$ | 0 |
| (2) 1 | 0 | $e_2$ | $e_1$ | $e_1$ | $e_2$ | $e_1$ | 1 |
| (3) 0 | 1 | $e_1$ | $e_2$ | $e_2$ | $e_1$ | $e_1$ | 1 |
| (4) 1 | 1 | $e_2$ | $e_2$ | $^*e_1$ | $^*e_1$ | $e_2$ | 0 |

In the above table the asterisk (*) has been applied to the combination of high input signals which renders a tube conductive. Under all other conditions the tubes are non-conductive. Furthermore, if either one alone of the tubes 16, 17 is conductive, the common output potential is $e_2$. Both tubes must be simultaneously non-conductive in order to deliver the output signal $e_1$.

Tubes 16 and 17, like tubes 12 and 13 are only intended to produce the units digit of a summation. So the determination of an output carry signal is left to be obtained by the use of still another triode tube pair 14, 15. Tube 14 is subject to joint control by potentials $a'$ and $b'$ which are the inverse of the digit representations $a$ and $b$. Tube 15 is subject to joint control by the tentative sum representing potential $s$ and by potential $c'_i$ which is the inversion of the incoming carry signal. A tabulation of possible permutations of these potentials follows:

| | Numbers Same as in Above Tables | | | Voltage Values of | | | | Conductive State (*) | | Voltage Output on Wire 22 | Digit Value $C_0$ |
|---|---|---|---|---|---|---|---|---|---|---|---|
| | a | b | $c_i$ | $a'$ | $b'$ | $s$ | $c'_i$ | Tube 14 | Tube 15 | | |
| (1) | 0 | 0 | 0 | $e_1$ | $e_1$ | $e_2$ | $e_1$ | * | | $e_2$ | 0 |
| | 0 | 0 | 1 | $e_1$ | $e_1$ | $e_2$ | $e_2$ | * | | $e_2$ | 0 |
| (2) | 1 | 0 | 0 | $e_2$ | $e_1$ | $e_1$ | $e_1$ | | * | $e_2$ | 0 |
| | 1 | 0 | 1 | $e_2$ | $e_1$ | $e_1$ | $e_2$ | | | $e_1$ | 1 |
| (3) | 0 | 1 | 0 | $e_1$ | $e_2$ | $e_1$ | $e_1$ | | * | $e_2$ | 0 |
| | 0 | 1 | 1 | $e_1$ | $e_2$ | $e_1$ | $e_2$ | | | $e_1$ | 1 |
| (4) | 1 | 1 | 0 | $e_2$ | $e_2$ | $e_2$ | $e_1$ | | | $e_1$ | 1 |
| | 1 | 1 | 1 | $e_2$ | $e_2$ | $e_2$ | $e_2$ | | | $e_1$ | 1 |

To summarize the operation of the circuit of Fig. 5 it should be observed that in one binary digit stage of a multi-digit adder the augend and addend signals are caused to control tubes 12, 13 and 14. The common output $s$ from tubes 12 and 13 is applied directly to tubes 17 and 15 for partial control thereof, and is subjected to an inversion process in tube 18, giving $s'$. Tube 16 is subject to joint control by output $s'$ from tube 18 (representing the inversion of the summation signal $s$) and by the inversion $c'_i$ of a carry signal $c_i$ which is brought in from a lower denominational order of the adder. Tube 17 is jointly controlled by said carry signal $c_i$ and by the common output $s$ from tubes 12 and 13. Hence the function performed by tubes 16 and 17 in combination is to deliver a signal $S_0$ which represents the units digit of the summation $a+b+c_i$.

The ordinal carry digit $C_0$ of the same summation $a+b+c_i$ is what we obtain from the common output circuit of tubes 14 and 15. This is true because, looking at the table last above presented, a binary ordinal carry occurs only when there are at least two binary 1's to be added. There are four of the eight different permutations of the $a$, $b$ and $c_1$ numbers which involve ordinals-carry "1," these being as indicated by numeral "1" in the column headed "Digit value $C_0$." These occurrences are the result of making both tubes 14 and 15 nonconductive at the same time.

Considering further the eight different permutations of three numbers to be added, the carry signal $C_0=0$ (in effect "no carry") occurs in the four cases where one or the other of the tubes 14 and 15 are conductive, representing a summation not greater than "1." Hence the significance of the $C_0$ signal is obtained irrespective of the value of signal $S_0$. The summation expressed as a two-digit binary number may, therefore, be properly represented by $C_0$ and $S_0$ as 00, 01, 10, or 11, these being the four possible results of adding a lower order carry to the sum of two binary digits of a particular denomination.

It will be understood by those skilled in the art, in view of the foregoing description of several illustrative embodiments of our invention, that various modifications and combinations of our "building block" units, and different members of the same, can readily be assembled for meeting the requirements of different complex switching operations. What is particularly stressed as a novel feature of our invention is that our basic "building block" circuit can be so concatenated with other similar circuits as to maintain equality of voltage swing between the input to one stage and the input potential applied to a succeeding stage, thus enabling us to maintain this same equality without appreciable departure from a chosen range between high and low signal potentials, even where numerous stages are involved.

It will also be appreciated that the utility of our basic "building block" circuit is not confined to electronic devices for performing mathematical computations. Thus, if we substitute any statements as used in symbolic logic for the information which distinguishes between 0 and 1 in the binary numeral system, we find that the building block circuit as herein shown is still useful without any modification. So, generally speaking, it is proposed to construct various embodiments of electronic switching systems out of these basic building blocks for the purpose of performing switching operations of a more or less complex nature and particularly to accomplish the desired results with a minimum of tube and other circuit components. Also, in order to achieve high speed performance and dependability of control it has been found that the herein disclosed switching circuit has numerous advantages over circuits previously known that were used for similar purposes.

We claim:

1. A basic electronic switching circuit for delivering one or the other of two output voltages each dependent upon the input voltages simultaneously applied to the single grid of a triode discharge element, said circuit comprising said discharge element, resistors of equal value parallel-connected to said grid and each carrying a distinct one of said input voltages as developed with respect to the cathode of said element, a direct current source having a three-section voltage divider connected across its positive and negative terminals, an anode connection to the junction between the two voltage divider sections which are positive with respect to the third said section, an output lead connected to the positive end of said third section, and means including said voltage divider, the respective values of its sections being suitably chosen for operative functional performance, whereby there is developed on said output lead a voltage which, with respect to a fixed potential, has one or the other of two values corresponding substantially to the high and low values of said distinct input voltages.

2. A basic switching circuit according to claim 1 and including means for so adjusting the cut-off bias of said element as to obtain a desired point of separation between high and low output voltages which result in one case from the coincidence of input voltages of sufficiently negative value to effect a non-conductive state in said element, and in another case from the coincidence of input voltages of sufficiently positive value to effect conduction in said element.

3. In combination, a plurality of basic switching circuits, such as defined by claim 1, and constituting concatenated stages, the output lead from one stage being operative to deliver an input voltage to a succeeding stage.

4. A basic electronic circuit as defined in claim 1 and including means for applying simultaneously to the grid of said device signal potentials from three or more independent sources, each potential having one or the other of two values $e_1$ and $e_2$ and the grid being normally so biased with respect to the cathode as to effect discrimination between two predetermined ranges of grid control potentials, one said range being to render the device conductive and the other range being to render the device non-conductive.

5. A basic electronic circuit for respondng to either of two simultaneous transient conditions, said circuit comprising an electron discharge device of the triode type, resistive connections of equal value parallel-connected in input circuits between the grid and cathode of said device, each of said connections including separate signal sources, a direct current source having a three-section voltage divider connected across its positive and negative terminals, an anode connection to the junction between the two voltage divider sections which are positive with respect to the third said section, and an output lead connected to the positive end of the third said section, the resistive values of said sections being so proportioned with respect to the gain characteristics of said device as to effect an output voltage having one or the other of two predetermined values depending upon the state of conduction or non-conduction in said device, said output voltage values being substantially the same as the high and low values respectively of any of said transient condition-representing potentials.

6. A basic electronic circuit as defined in claim 5 in combination with an electronic inverter device, whereby the relative polarities of the output potentials are reversed.

7. An electronic switching device for producing discriminatory effects in response to the joint control of said device by simultaneously applied input signals from a plurality of independent potential supplies, each of the signals being alternatively deliverable at one or the other of two predetermined potentials with respect to ground potential, said device comprising a single triode discharge tube powered by a direct current source, an anode resistor connected from the positive terminal of said source to the anode of said tube, a connection from an intermediate tap on said source, taken as ground potential, to the cathode of said tube, a two-section voltage divider connected at one end to the anode of said tube and at the other end to the negative terminal of said source, a utilization circuit connected between the junction point of said voltage divider sections and ground, resistors of equal value connected between the control grid of said tube and each of said potential supplies respectively, and means including said anode resistor and said voltage divider for causing the output potential to be maintained at one or the other of two values each corresponding respectively to the high and low voltages of said input signals.

8. An electronic switching device according to claim 7 wherein, of said deliverable signal potentials, one is established at ground potential and the other is established below the cut-off point of said tube, said cut-off point being also below ground potential.

9. An electronic switching device according to claim 7 wherein, in reference to the two established potentials of said signals, the cut-off point of grid potential is closer to one than to the other.

10. An electronic computer stage for obtaining the sum of two binary digits and for combining therewith an incoming carry signal, the operative result being to deliver two output signals one of which signifies the primary digit value of the summation of said two binary digits plus the value of said incoming carry signal and the other of which signifies the value of an outgoing carry signal applicable to a stage of higher denominational order, said computer stage comprising a pair of triode discharge tubes having their anodes interconnected and supplied with anode potential through a common anode resistor, the cathodes being grounded, means for applying augend and addend signals simultaneously to the grids of said tubes, the augend signal when applied to the grid of one tube being of a polarity which is the inverse of the augend signal applied at the same time to the grid of the other tube, the inverse relationship of signal potentials being also characteristic of the addend signals, a voltage divider connected between the anodes of said tubes and a direct current source terminal which is more negative than the cathodes of said tubes, an output circuit connection at an intermediate point of said voltage divider, means for inverting the sense of the output potential of said intermediate point, ,a second pair of triode discharge tubes having circuit parameters corresponding to those of the first pair, one tube in this second pair being subject to joint control by an output signal from said sense-inverting means, and by the inverse of an incoming carry signal, the other tube in said second pair being subject to joint control by the direct output from said first pair and by said incoming carry signal, a third pair of triode discharge tubes having circuit parameters corresponding to those of the first and second pair, one tube of this third pair being subject to joint control by the inverse of said augend and addend signals respectively, and the other tube in said third pair being subject to joint control by direct output from said first pair and by the inverse of said incoming carry signal, the functions of the second and third pairs being to deliver the two output signals respectively, as first above mentioned.

11. An electronic circuit arrangement for adding binary numbers comprising a separate stage for each denominational order, each stage comprising a first group of electronic devices having a complement of input and output circuit parameters, means inherent in the structure of said group for combining certain input voltages which represent the primary digit values of two digits to be added, the output voltage from said group being representative of the units digit of a tentative sum, second and third groups of electronic devices identical with respect to the first group and a voltage inverter subject to control by output from the first group, means inherent in the structure of the second group for producing an output voltage representative of the units digit of a final sum which reflects the addition of a carry-over digit to said tentative sum, the voltage representing this carry-over digit being derived from a preceding stage, and the voltages representative of the tentative sum being applied directly from the output of the first group and simultaneously from said voltage inverter, and means inherent in the structure of the third group for so combining input voltages derived from (*a*) the source of those first above mentioned, (*b*) the output of the first group and (*c*) a voltage which is the inverse of said voltage representing carry-over digit, that the output from the third group is representative of a carry-over digit to be taken into a higher order stage.

12. An electronic switching circuit comprising at least two triode discharge elements having their anodes interconnected, a voltage divider having three sections, the most positive of which is connected between said anodes and the positive terminal of a direct current source, the intermediate and most negative sections being serially connected to the negative terminal of said source, an output circuit connected from the junction point of the last mentioned sections to a point of fixed potential, means for fixing a common cathode potential intermediate between the potentials of said direct current source terminals, and a plurality of input circuit resistors of equal value connected to the grid of each triode element, and in circuit between said grids and cathodes of said elements, each said grid being subject to joint control by signal potentials separately applied through at least two of said resistors, and each of said signal potentials having either one or the other of two predetermined values depending upon their significance, said switching circuit being further characterized in that it is enabled to deliver an output potential substantially equal to the high voltage limit of said input signal potentials whenever all said discharge elements are non-conductive, and to deliver an output potential closely approximating the low voltage limit of said input signal potentials whenever any one or more of said discharge elements is rendered conductive.

13. A basic electronic switching circuit including a triode, a plurality of equal resistive elements parallel connected to the grid of the triode, each having a high potential "*a*" or a low potential "*b*" applied thereto, said elements combining said potentials to cut off or allow conduction of the triode, a source of DC potential having positive and negative terminals, and a voltage divider connected between said terminals and having a center tap, the anode of the triode being connected to the voltage divider on the positive side of the center tap, and the voltage divider values being such that the center tap thereof assumes potentials substantially equal to "a" and "b" when the triode is cut off and conducting respectively.

14. A basic electronic switching circuit including in each stage a triode, a plurality of equal resistive elements parallel connected to the grid of the triode, each having a high potential "a" or a low potential "b" applied thereto, said elements combining said potentials to cut off or allow conduction of the triode, a source of DC potential having positive and negative terminals, and a three section voltage divider having a center tap between the negativemost section and the other two, the anode of the triode being connected to the voltage divider between said other two sections, and said sections being so valued that when the triode is cut off and conducting perspectively, said center tap assumes potentials which are substantially equal to "a" and "b" and are applicable to a said resistive element in each of one or more other stages.

WILLIAM HENRY BURKHART.
AMIR HASSAN SEPAHBAN.

REFERENCES CITED

The following references are of record in the file of this patent:

FOREIGN PATENTS

| Number | Country | Date |
|---|---|---|
| 363,403 | Great Britain | Dec. 18, 1931 |